Aug. 26, 1958 — A. F. THIELEN, JR — 2,848,746
METHOD OF FORMING A SEAL
Filed July 5, 1955

INVENTOR.
ALBERT F. THIELEN, JR.
BY
Carl H. Lynnestedt
AGENT

United States Patent Office 2,848,746
Patented Aug. 26, 1958

2,848,746

METHOD OF FORMING A SEAL

Albert F. Thielen, Jr., Melrose Park, Pa., assignor to Philco Corporation, Philadelphia, Pa., a corporation of Pennsylvania Application July 5, 1955, Serial No. 519,834

1 Claim. (Cl. 18—47.5)

This invention relates to molding, and more particularly, to a method of injection molding an article of pliable or resilient material in a form which is different from that form desired for the end product.

In the molding of resilient materials, such as, for example, rubber or vinyl compounds, it is at times desirable to mold an article having undercut portions necessary in the article, as used. It is fundamental to molding processes, particularly injection molding, that a molded article must be easily removable from the mold after it has been formed. If at all possible, in order to facilitate removal of the article, undercuts should be avoided, particularly since speed is one of the advantages afforded by injection molding. Heretofore in the art, in order to produce an undercut requisite to the design of the article, it has been the practice to resort, for example, to split-mold techniques wherein a plurality of removable mold sections are provided. Such techniques have not proven economical and satisfactory, inasmuch as the intricacies of the mold sections are such as to result in high costs. Additionally such molds are difficult to maintain since, in the interest of rapid performance of the molding operation using an undercut type mold, the removable sections are operated by suitable mechanisms built, for example, into the mold itself.

The present invention contemplates the use of straightforward molding of what can be termed the "reverse form" of an article, using a one-piece mold, followed by turning the article "inside-out" in order to produce the desired final form of the article including its undercut portion.

With the foregoing in mind it is the primary object of this invention to provide a novel method of molding which will enable articles of pliable material having undercut sections to be molded by means of straightforward molding techniques wherein one-piece mold sections are used.

It is a further object of this invention to provide a novel method of molding a cup-like article which, as used, has an undercut, radial, circumferential slot.

Another object of this invention is to provide a reverse form of a cup-like article having a straightforward grooved portion, which article, when turned inside-out, has an exterior undercut groove along a portion of its periphery.

It is still another object of this invention to provide a method eliminating complicated and costly molds.

It is also an object of this invention to provide a method of molding an article of resilient material wherein a desired undercut section is obtained by molding the article in one equilibrium condition, and then deflecting the article to another equilibrium condition which constitutes its final form.

The manner in which the foregoing objects and advantages of the invention may best be achieved will be fully understood from a consideration of the following detailed description in the light of the accompanying drawings, in which.

Figure 1:
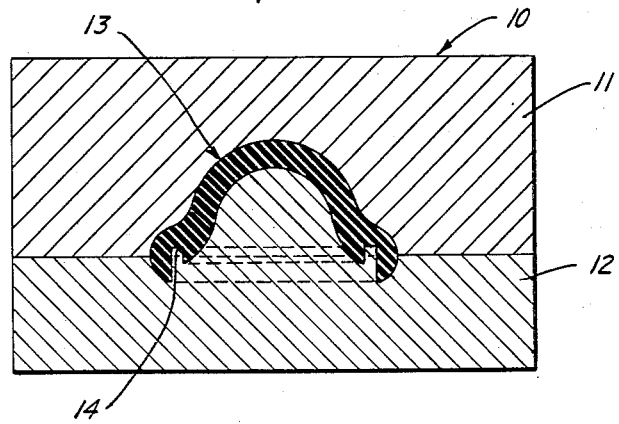
Figure 1 is a sectional view of a mold for producing the "reverse form" of a desired cup-like article, shown by way of example.

Now making more particular reference to the drawing, and especially to Figure 1 thereof, there is illustrated a conventional mold 10 including one piece cavity and core sections shown at 11 and 12, respectively, and adapted for molding of the reverse form of a cup-like plastic article shown at 13 and having an axially-presented circumferential groove 14, as illustrated.

In the molding operation, and as will be understood, suitable pliable material in its plastic state is injected into the mold through ports or "gates" (not shown), the material being permitted to harden prior to separation of the mold sections 11 and 12. Since the actual molding operation makes use of apparatus and techniques which are well known in this art; and because the invention does not reside in the molding operation per se, further and more detailed description is not required herein. It will be appreciated, however, that removal of the molded article is accomplished with ease, following separation of the cavity and core sections, inasmuch as that portion of the mold defining the slot or groove 14 is axially presented and the sides of the molded groove are therefore substantially parallel to the line along which the article is parted from the mold.

Figure 2:
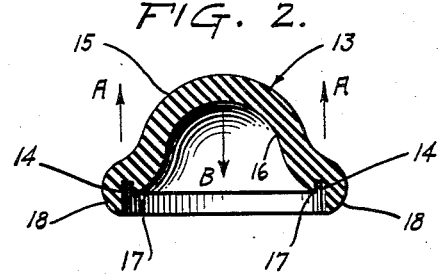
Figure 2 is a sectional view of the molded article with directional arrows showing the relative movement imparted to portions of the article in order to arrive at its functional, or final, form.

Following separation of the one-piece mold sections 11 and 12, and stripping of the article 13 from the mold, the sprue (not shown) is removed from the article, whereupon said article has the form illustrated in Figure 2.

Figure 3:
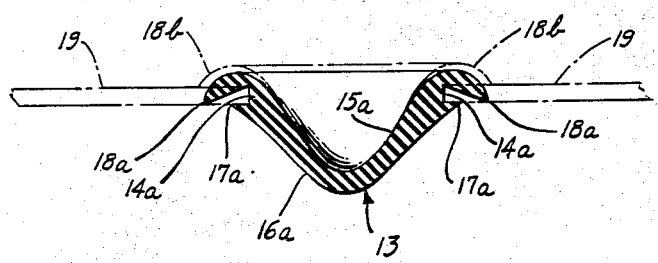
Figure 3 is a sectional view of the finished article after conversion, or deflection, to its final form.

As appears from the arrows shown in Figure 2, and in particular accordance with my invention, the outer edges, including grooved portion 14 along with inner and outer bead portions 17 and 18, respectively, of the reverse form of the article, are forced in the direction indicated by arrows A, and at the same time the central portion of concave surface 15 of the cup-like article is forced in the direction indicated by arrow B. In this way the concave side 16 is forced in the direction of and beyond the plane of the circumferential groove 14, whereupon, as illustrated in Figure 3, said side 16, which was formerly concave, is moved to an opposite equilibrium position, shown at 16a, in which it is convex. Similarly the convex portion 15 becomes concave portion 15a, the outer bead 18 becomes outer bead 18a, whereas the inner bead 17 takes the position shown at 17a. The foregoing inside-out motion, in turn, imparts both a rotative and a translative movement to the bottom and sides of grooved portion 14, whereupon it assumes the position and proportions which characterize the full line showing of groove 14a of Figure 3.

In the end product, as shown in full lines in Figure 3, it will be seen that a pliable cup-like article has been provided, and that in this article there is included the desired undercut, radially presented circumferential slot or groove (14a).

It should be noted that following the "reversing" procedure described just above the resultant undercut groove 14a terminates in an annular flange portion (formed by the above-mentioned bead 18a) which is angled backwardly toward the main body of the article and overlies the bottom of the slot 14a. This angularity of the bead, or flange, causes the latter to bear forcibly against the adjacent edge portions of an aperture provided in wall structure shown in broken lines at 19, thereby making it possible for the article, or member, to close such an aperture and to provide a positive seal about the edges thereof. In being brought to bear against wall structure 19 the bead portion 18a is deflected to a position shown by broken lines at 18b.

It will be understood that while the article shown and described has a particular configuration adapting it for use in sealing an apertured panel, as described, the principles of the invention are of broader applicability, it being evident that the method of this invention could be utilized in the molding of undercut members or articles of a wide variety of shapes, intended for use in various ways.

I claim:

In a method of forming a seal for a sheet-like member having an aperture defined by centrally presented edge portions of said member, the steps comprising: molding a cup-like body of pliable material having a pair of flange portions defining a slot opening in the direction of the concavity of said cup-like body; turning said body inside-out to form a reversed cup-like body in which the concave surface of the molded body is reshaped into a convex surface and the said slot faces transversely of the opening in said cup-like body; and inserting the reshaped body into such an aperture while engaging said transversely facing slot with the mentioned centrally presented edge portions, thereby to seal the aperture.

References Cited in the file of this patent

UNITED STATES PATENTS

| | | |
|---|---|---|
| 1,768,796 | Sleeper | July 1, 1930 |
| 2,272,119 | Jaeckel | Feb. 3, 1942 |
| 2,292,290 | Robins | Aug. 4, 1942 |
| 2,650,633 | Eger | Sept. 1, 1953 |